Dec. 22, 1942.  J. M. JOHNSON  2,305,967
SWEEP RAKE STACKER
Filed July 22, 1941  4 Sheets-Sheet 3
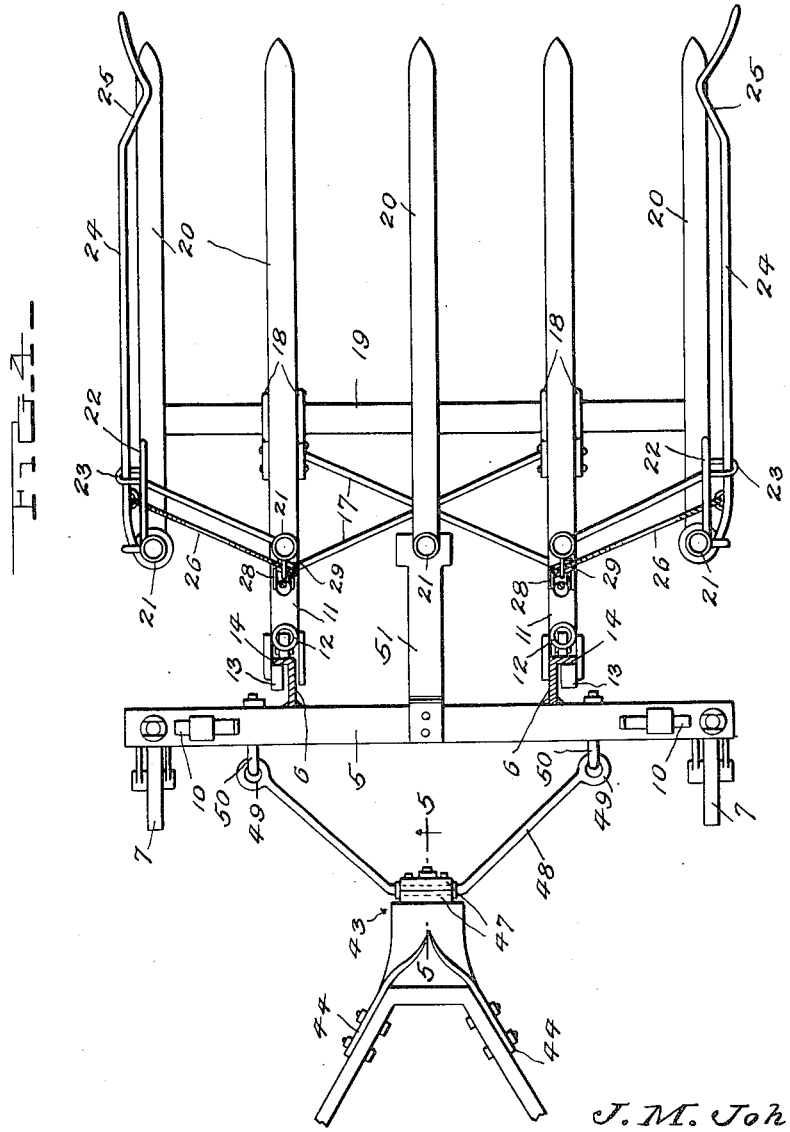
J. M. Johnson,
INVENTOR.
BY Knowles Dec. 22, 1942.  J. M. JOHNSON  2,305,967
SWEEP RAKE STACKER
Filed July 22, 1941  4 Sheets-Sheet 4
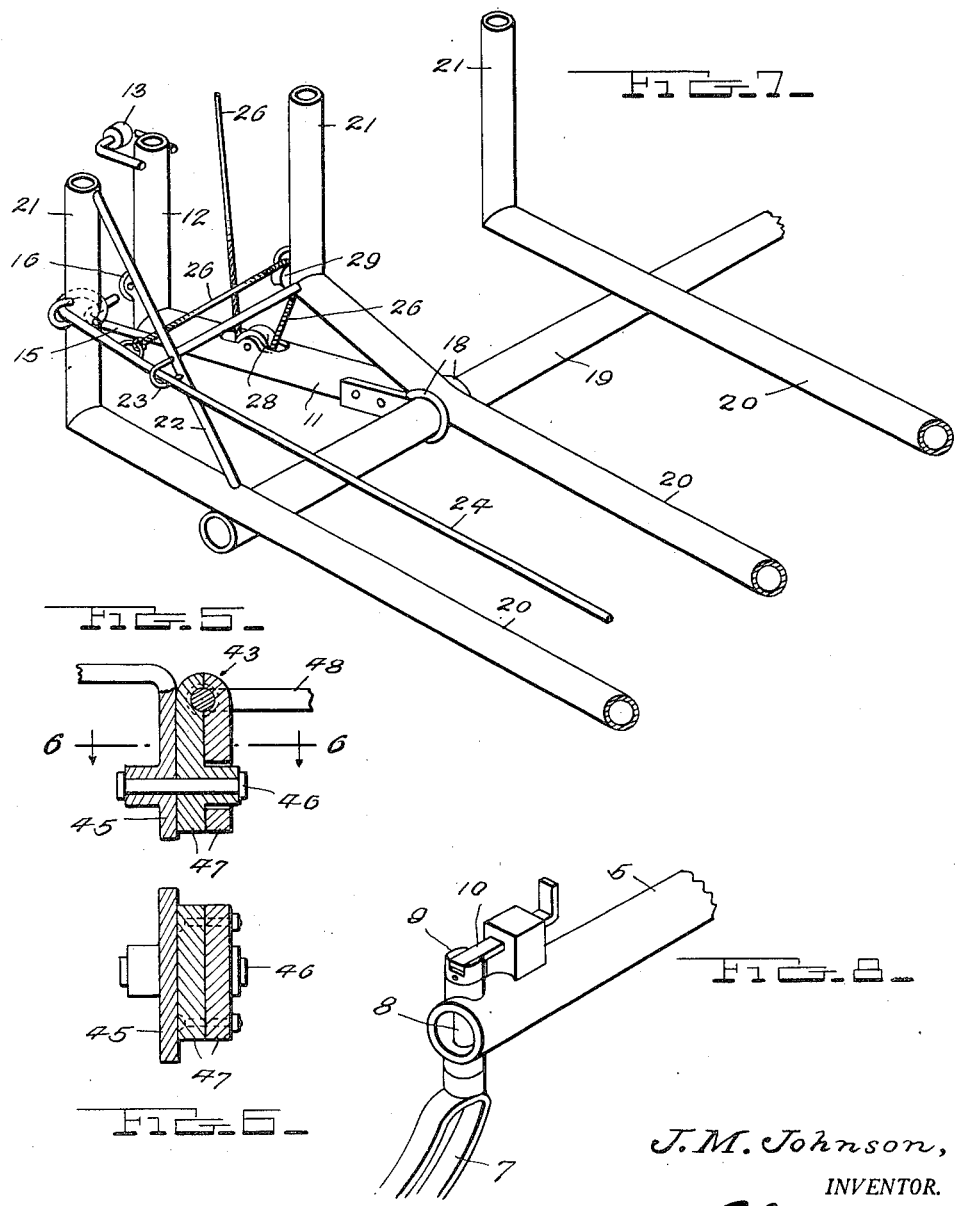
J. M. Johnson,
INVENTOR.
BY CASnowles Patented Dec. 22, 1942

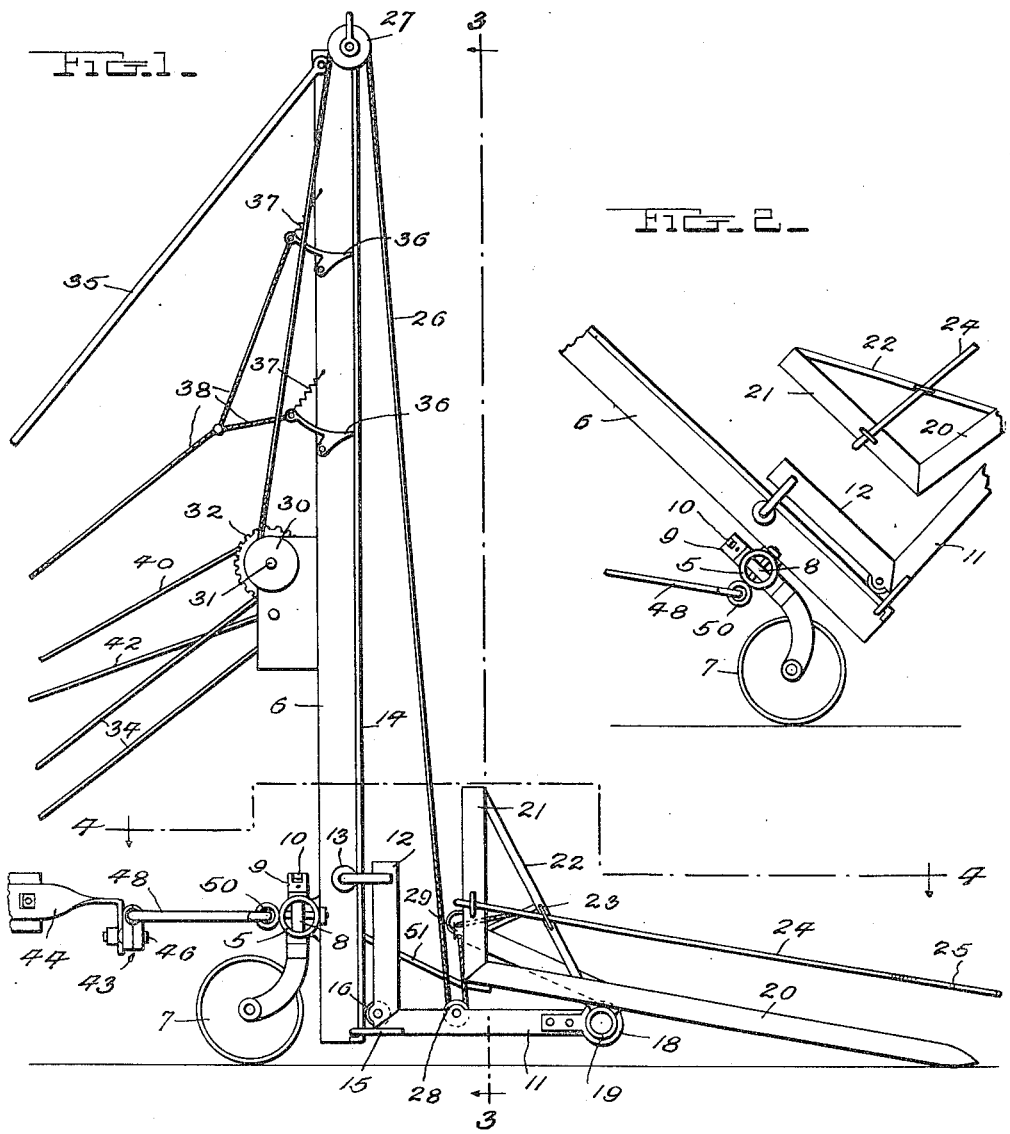

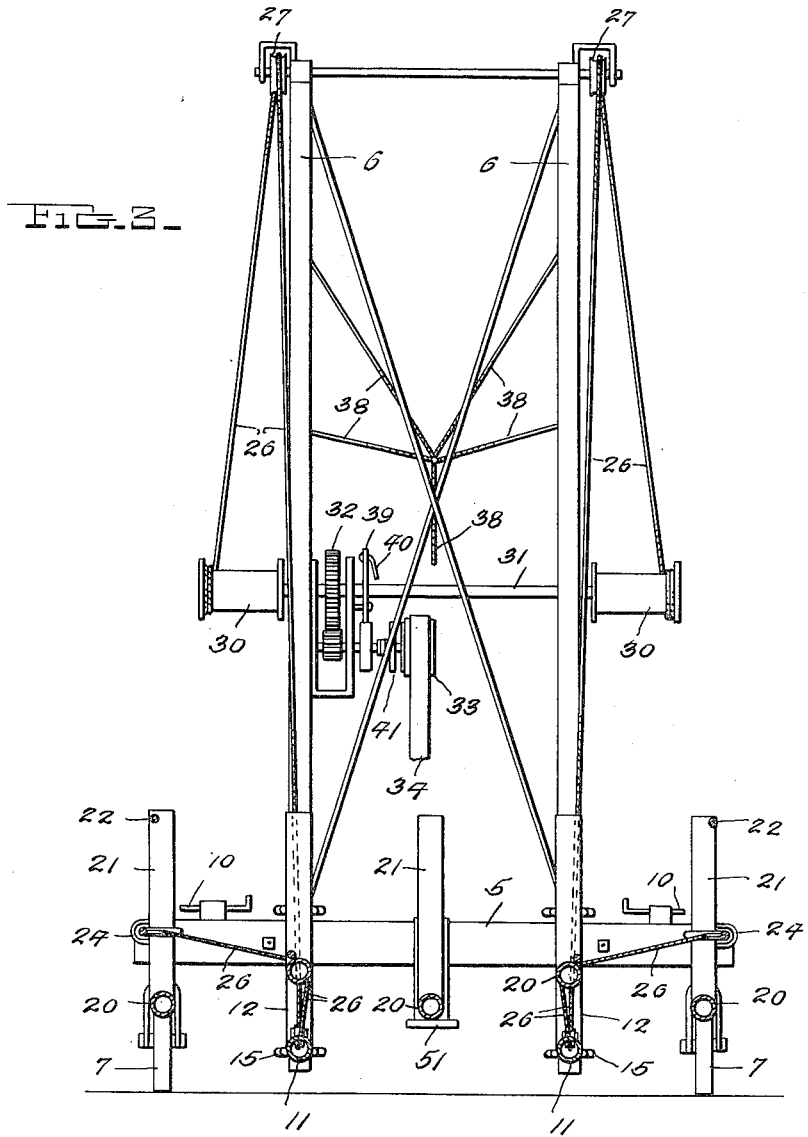

2,305,967

UNITED STATES PATENT OFFICE 2,305,967

SWEEP RAKE STACKER

John Melvin Johnson, Lindsborg, Kans.

Application July 22, 1941, Serial No. 403,582

2 Claims. (Cl. 214—113)

This invention relates to agricultural machines, and more particularly to agricultural machines known as sweep rake stackers.

The primary object of the invention is to provide a machine of this character embodying forwardly extended teeth adapted to move over the ground surface picking up the material being raked, means being provided for tilting the rake rearwardly as well as means for gripping and holding the load on the rake teeth, while the teeth are being elevated to a dumping position.

Another object of the invention is to provide means for automatically moving the load gripping members into engagement with the load, with the initial movement of the cables to elevate the load, the gripping members acting to press the sides of the pile of straw or hay on the teeth, inwardly compressing the load to prevent the load from spilling.

A further object of the invention is to provide a swivel connection between the machine and tractor with which the machine is used, the swivel connection being so constructed that any possibility of the stack tilting under the load, when the rake teeth are elevated to the dumping position, is eliminated.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of the sweep rake and stacker, constructed in accordance with the invention, the raking section of the machine being shown in its lowered position.

Figure 2 is a fragmental elevational view illustrating the rake as tilted rearwardly when the machine is being moved from place to place.

Figure 3 is a sectional view taken on line 3—3 of Figure 1.

Figure 4 is a sectional view taken on line 4—4 of Figure 1.

Figure 5 is a sectional view taken on line 5—5 of Figure 4.

Figure 6 is a sectional view taken on line 6—6 of Figure 5.

Figure 7 is a fragmental perspective view illustrating a portion of the rake, the rake being in its lowered position.

Figure 8 is a fragmental perspective view illustrating the latch members for holding the caster wheels, on which the rake is supported, against movement.

Referring to the drawings in detail, the sweep rake stacker embodies a frame comprising the main supporting member 5 which in the present showing, is in the form of a heavy metal tube. Rising from the main supporting member 5, and disposed in spaced relation with respect to each other, are uprights 6 constructed of angle bar material, the web of the angle bar material being secured to the forward edge of the main supporting bar 5, at points near the lower ends of the uprights. The frame is supported on the casters 7 which have their shanks 8 extended through bearing openings, formed in the supporting member 5, adjacent to the ends thereof. The upper ends of the shanks 8 are supplied with heads 9 that in turn are formed with notches for the reception of the sliding latch members 10 that are supported on the main supporting member 5. Thus it will be seen that when it is desired to hold the casters 7 against movement, the latch members 10 are moved into the notches of the heads.

The rake embodies a frame comprising members 11 that have upwardly extended members 12 at their inner ends, the members 12 being disposed at right angles to the members 11. At the upper ends of the members 12, are wheels 13 that bear against the inner faces of the flanges 14 of the uprights 6. At the inner ends of the members 11, are arms 15 that have fingers at their free ends, overlapping the flanges 14 of the uprights, holding the lower ends of the frame inwardly. Wheels 16 are mounted on the members 11 adjacent to the arms 15, and run along the outer faces of the flanges 14. The members 11 are held in proper spaced relation with respect to each other, by means of the brace rods 17.

At the forward ends of the members 11, are bearings 18 in which the rake tooth supporting tube 19 operates, the rake tooth supporting tube 19 being mounted for pivotal movement within the bearings.

The rake teeth, which are indicated by the reference character 20 extend forwardly appreciable distances, the rear ends of the teeth extending upwardly as at 21 to hold the load against sliding rearwardly, when the rake is being elevated to its dumping position.

Connected with the end teeth of the rake, are rods 22, which are formed with guides 23, in which the movable load-retaining arms 24 are mounted. The rear ends of the load-retaining arms 24 being secured to the upwardly extended ends 21 of the teeth. These guides are of sufficient length to permit the arms 24 to move toward and away from the load. It might be further stated that these arms are constructed preferably of spring material, so that the arms will be normally held in their inactive positions. At the outer ends of the arms 24, are offset portions 25 that engage the load and prevent the load from sliding from the rake fingers.

The rake operating cables are indicated by the reference character 26 and operate over the pulleys 27 that are mounted at the upper ends of the uprights 6, the cables passing over pulleys 28 mounted on the members 11, from where they move upwardly over the pulleys 29 mounted on the upwardly extended ends of the rake teeth. The cables now move laterally, where they are connected to the load-retaining arms 24.

These cables 26 are wound on the drums 30 that are mounted on the ends of the power shaft 31, the power shaft 31 being operated through the gearing 32 that in turn is operated by the pulley 33 over which the belt 34 operates, the belt 34 also moving over a power pulley of the tractor, with which the device is used, and which in the present showing has been omitted.

In order that the rake frame will be held in an upright position at all times, brace rods 35 are provided, the brace rods 35 being connected with the uprights 6, at their upper ends, the opposite ends of the brace rods being connected with the tractor.

Pivoted latch members 36 are mounted on the uprights 6, and normally lie in the path of travel of the rake frame. As the rake frame is elevated, the wheels 13 and arms 15 move past the pivoted latch members. Springs 37 are connected with the pivoted latch members and operate to normally urge the latch members inwardly. As the wheels 13 and arms 15 pass the latch members, and the weight or load is released, it will be obvious that the wheels 13 and arms 15 will drop onto the latch members 36, where the load is held suspended until dumped. Hand operated cables 38 have connection with the latch members, and when pulled, act to move the latch members 36 away from the wheels 13 and arms 15, releasing the rake frame, allowing the frame and rake supported thereby, to move downwardly to its active or raking position as shown by Figure 1 of the drawings.

A suitable braking mechanism indicated at 39 is operated by the rod 40, so that the movement of the rake frame and rake, along the uprights, may be regulated.

A suitable clutch mechanism indicated at 41 is provided for throwing the power shaft into and out of operation. This clutch mechanism 41 is operated by the clutch rod 42. The connection between the tractor and sweep rake stacker is made through the swivel coupling indicated generally by the reference character 43 and comprises diverging arms 44 that are bolted to the tractor frame. A bearing opening is formed in the downwardly extended portion 45 of the coupling for the reception of the king pin 46.

The coupling also embodies the separable members 47 in which the V-shaped rod 48 is mounted, the rod 48 having eyes 49 at its free ends, the rod being connected with the eye bolts 50, that extend through the main supporting member 5. Thus it will be seen that due to this construction, the sweep rake stacker, will have a universal movement with respect to the tractor, thereby compensating for irregular surfaces, over which the machine may be moving.

Mounted on the main supporting bar 5, at a point substantially intermediate its ends, is a wide spring 51, that extends forwardly, the spring 51 being of a length to extend under the central tooth of the rake, providing a stop for the rake. This spring 51 acts to normally tilt the teeth of the rake forwardly and hold them to the ground surface. It will of course be understood that this spring will permit of free pivotal movement of the rake section, allowing the free ends of the teeth to move over irregularities while they are being held in contact with the ground surface.

In the operation of the machine, the machine is pushed forwardly over the field in which the hay or straw is to be removed and stacked. As the material collects on the teeth, and the teeth of the rake become loaded, the clutch mechanism of the power shaft is operated whereupon the cable 26 is wound on the drums 30. With the initial movement of the cable, the arms 24 are moved inwardly into close engagement with the load and the rake is tilted rearwardly preventing the load from sliding laterally or forwardly from the rake. On continued movement of the cable as it is wound on the drums, the rake frame will be elevated and held in its elevated position by the pivoted latch members 36. When the load has been moved to the proper dumping position, the clutch mechanism is operated releasing the rake, allowing the fingers thereof to tilt forwardly under the load, dumping the material in a stack. The latch members 36 are now moved to release the rake frame, whereupon the rake frame moves downwardly to the position as shown by Figure 1. The cable 26 is now slightly tightened until the rake has assumed its proper raking position, and the operation as described is repeated.

In view of the foregoing disclosure, it is believed that a further detail disclosure as to the operation of the machine is unnecessary.

Having thus described the invention, what is claimed is:

1. A combined sweep rake and stacker, comprising a wheel supported frame, spaced uprights mounted on the frame, a rake frame mounted for vertical movement on said uprights, a rake comprising connected rake teeth pivotally mounted on the rake frame, load-engaging arms connected with the rake and disposed along the side edges of the rake, said arms adapted to move inwardly engaging the load carried on the rake, cables operating over the upper ends of the uprights and being connected with said rake frame, the rake and load-engaging arms, and said cables adapted to draw said load-engaging arms inwardly when said cables are tightened, and said cables adapted to subsequently elevate the rake frame and rake, and hold said rake in its supporting position at the upper end of the uprights.

2. A combined sweep rake and stacker, comprising a wheel supported frame adapted to be coupled to a power device, a pair of spaced uprights mounted on the frame, a rake frame mounted for vertical sliding movement on the uprights, a rake embodying a plurality of connected rake fingers, pivotally mounted on the rake frame, a pair of horizontally disposed laterally movable load-engaging fingers, connected with the rake and extending along the side edges of the rake in spaced relation therewith, cables connected with the rake frame, lateral load-engaging arms vertically movable retaining arms mounted on the rake, and said cables being connected with the arms and adapted to operate simultaneously to draw the arms into engagement with the load on the rake and means for moving said arm away from the load when the rake is dumped.

JOHN MELVIN JOHNSON.